Fig. 2

INVENTORS
JESSE BARBER
JAMES R. BARBER
BY
Wells & St.John
ATTYS.

July 5, 1966  J. BARBER ET AL  3,259,278
FERTILIZER DISTRIBUTION APPARATUS
Filed Aug. 24, 1964  7 Sheets-Sheet 5

Fig. 6

INVENTORS
JESSE BARBER
JAMES R. BARBER
BY
Wells & St.John
ATTYS.

INVENTORS
JESSE BARBER
JAMES R. BARBER
BY Wells & St. John
ATTYS.

July 5, 1966  J. BARBER ET AL  3,259,278
FERTILIZER DISTRIBUTION APPARATUS
Filed Aug. 24, 1964  7 Sheets-Sheet 7

INVENTORS
JESSE BARBER
JAMES R. BARBER
BY
ATTYS.

United States Patent Office 3,259,278
Patented July 5, 1966

3,259,278
FERTILIZER DISTRIBUTION APPARATUS
Jesse Barber and James R. Barber, both % Barber Engineering, N. 1404 Regal, Spokane, Wash.
Filed Aug. 24, 1964, Ser. No. 391,463
3 Claims. (Cl. 222—178)

This invention relates to a novel apparatus for distributing fertilizer in a field, particularly in a large scale applications. The apparatus is designed primarily for spreading fertilizer commercially over large acreages.

The present invention provides a truck mounted distribution arrangement designed to spread material over a wide swath through a field, in order to provide a fertilizer distribution system having an increased storage capacity as well as a wide distributing capability. The apparatus utilizes a bulk storage facility on a truck together with a metering distribution arrangement that is folded on the truck for transport purposes and which is extended outwardly to provide the necessary width for efficient application.

It is a first object of this invention to combine truck storage facilities with a truck mounted metering distribution arrangement to eliminate the requirement of a separate truck and tractor necessary in a conventional fertilizer distribution system using available equipment.

Another object of this invention is to provide such an arrangement which is relatively simple in construction from a mechanical standpoint, utilizing available metering devices, and providing easily operated power device for lifting the distribution assembly relative to the truck body.

Another object of this invention is to provide such a system using a metering system driven by the truck wheels, so that fertilizer is not wasted when the truck is not in motion or during the turning of corners.

Another object of this invention is to provide such a system wherein all of the ground engaging wheels utilized in the fertilizer distribution are coaxially arranged so that the wide truck mounted arrangement can be turned about a radius when necessary.

These and other objects will be evident from the following disclosure, taken together with the accompanying drawings, which illustrate a preferred form of the invention. It is to be understood that this form of the invention is merely exemplary, and is not intended to limit or restrict the scope of the invention, which is set out in the claims that follow.

The present invention comprises a truck mounted storage facility for fertilizer together with distribution hoppers and metered feed assemblies mounted on the same truck and connected to the storage facilities by a material delivery auger system. The distribution hoppers are foldable relative to the truck so as to be carried in a transport position along the sides of the truck, the hoppers being movable to extended lateral positions adjacent the ground surface for distribution purposes.

The basic truck is denoted in the drawings by the numeral 10. It includes a forward mounted cab 11 within which the driver of the truck has all the necessary controls for the operation of the machinery. The truck is provided with rear driving wheels 12 in a conventional fashion. The wheels 12 are protected by semi-circular fenders designated by the numeral 13.

Mounted on the rear portion of truck 10 are a series of three hoppers 14 having plane sloping sides 15 and lateral partitions 16. The hoppers therefore have downwardly converging sides that lead to individual openings 17 formed at the bottom edges of the respective sides 15.

Figure 2:
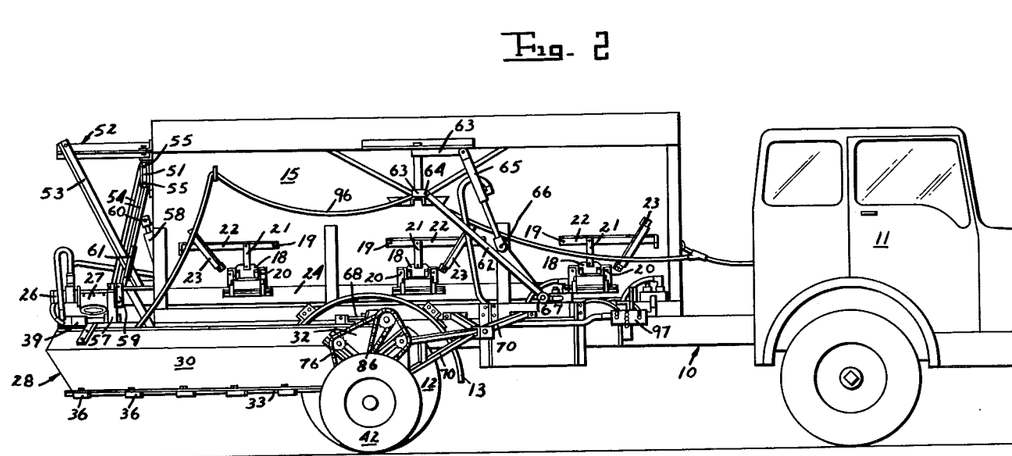
FIGURE 2 is a view similar to FIGURE 1, showing the fertilizer distribution hoppers in their field positions for operation.

The openings 17 are rectangular in shape, and are selectively covered by slidable rectangular doors 18 that can best be seen in FIGURE 2. The doors 18 slide in side frames 20 and are operated by a connecting link 21 pivoted at its upper end to an operating arm 22. The operating arm 22 for each door 18 is pivoted to the side wall 15 at 19. The opposite end of the arm 22 is guided by means of a fixed strap 23 so that the arm 22 moves adjacent to the outer surface of the hopper side 15 on which it is located.

Running along the bottom of each side 15 is an auger tube 24 into which the apertures 17 open. The tubes 24 can receive materials from within the hoppers 14 through the openings 17 controlled by the movable doors 18. A longitudinal auger 25 is coaxially mounted within each respective tube 24 adapted to longitudinally move material within the tubes 24 when operated. The augers 25 are individually powered by hydraulic motors 26 mounted at their rear ends. The rear end of each tube 24 is provided with a downwardly directed discharge tube 27 through which material within the tube 24 is directed.

The apparatus shown in the drawings includes two distribution hoppers generally designated as 28. Each hopper 28 is the mirror image of the other, and only one hopper will be described in the following description, it being understood that identical structure is utilized on the other.

Each hopper 28 has downwardly converging longitudinal sides 30 terminating at a rear end plate 31 and a forward end plate 32. At the bottom edges of the sides 30 is located a longitudinal metered feed housing 33 that encloses a metered feed screw 34 extending along the entire length of the distribution hopper 28. The housing 33 is provided with longitudinally spaced apertures 35 through which fertilizer within the hopper 28 is distributed on to the ground below the hopper 28 as it passes over the ground. The housing 33 is held in place by means of clamps 36. The metered feed arrangement illustrated is simply one example of such an arrangement that might be utilized, the assembly itself not being unique in this application. Directly above the metered feed arrangement is an agitator 37 that extends along the full length of the distribution hopper and which is rotated so as to break up lumps and larger particles of material in the hopper prior to passage of the materials into the feed housing 33.

Located above the agitator 37 is an inner trough 38 that extends the full length of the hopper 28. The bottom surface of the trough 38 is provided with longitudinally spaced apertures through which fertilizer can fall. The trough 38 encloses an auger 40 located directly above it and also extending the full length of the hopper 28. The auger 40 is designed to move material along the length of the trough 38 from its rear end to its front end as will be described below.

Figure 1:
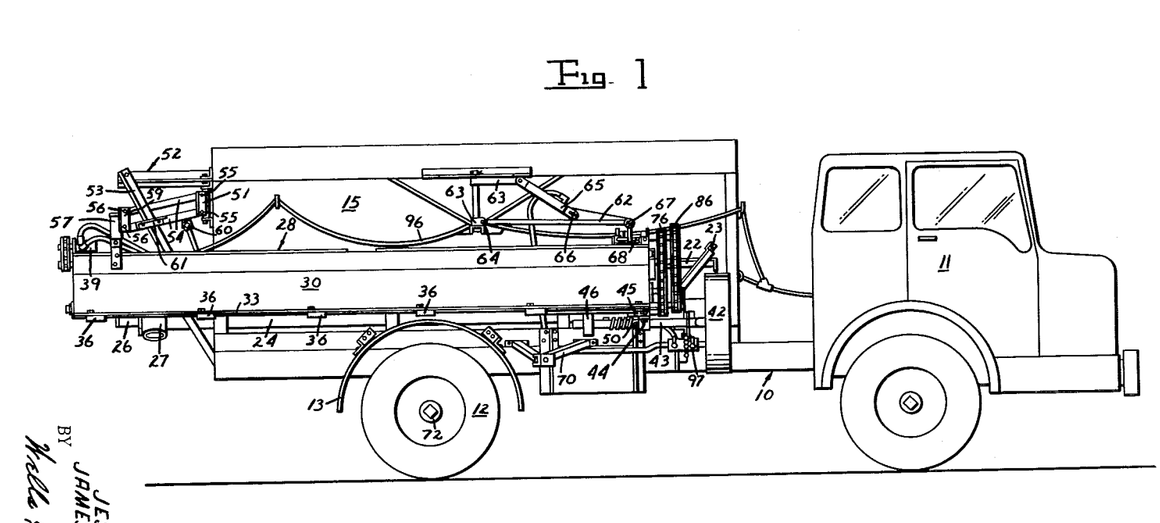
FIGURE 1 is a side view of the apparatus, the fertilizer distribution hoppers being mounted in their storage positions.
Figure 3:
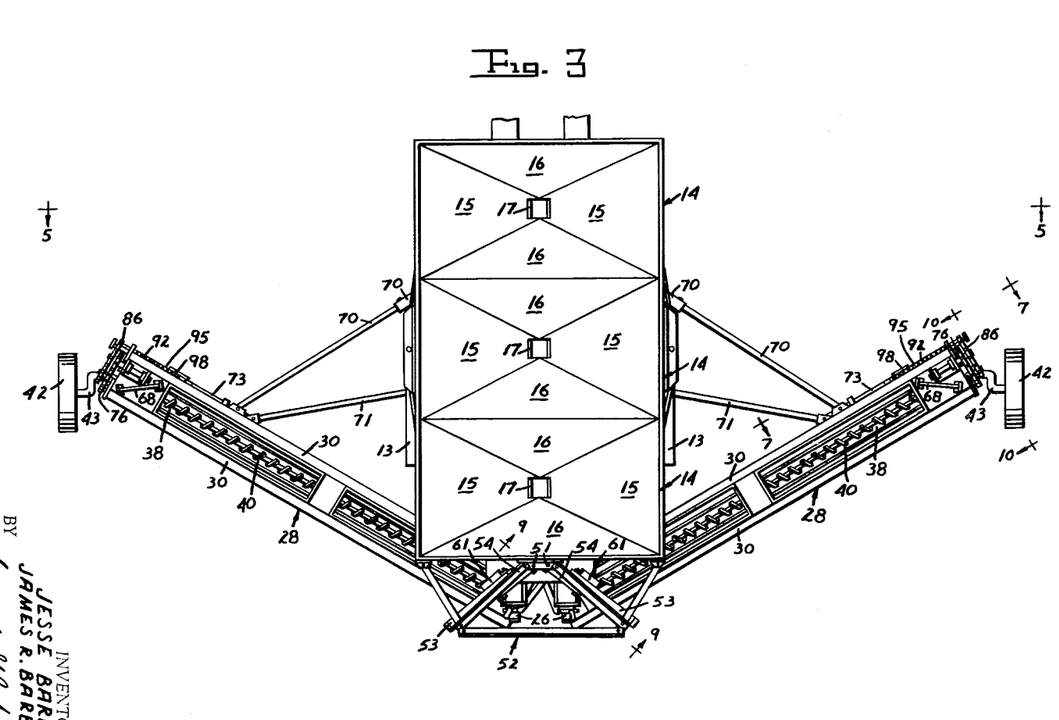
FIGURE 3 is a partial top view showing the storage hoppers and the distribution hoppers in their normal operating positions.

At the front or outer end of the hopper 28 is a ground engaging wheel 42 mounted for rotation on an offset axle 43. The axle 43 is rotatably journalled by a bearing 44 pivotally mounted on a plate 45 at the bottom of the hopper 28. The bearing 44 is pivotable so as to selectively allow the wheel 42 to be positioned as shown in FIGURE 3 parallel to the truck wheels 12 or as shown in FIGURE 1 parallel to the forward end plate 32. The inner end of the axle 43 is slidably supported by a fixed guide 46 on a hopper 28. The angular relation of the axle 43 is limited by a releasable pin 47 selectively located in one of two apertures 48, depending upon the desired angular position of the wheel 42.

The wheel 42 is spring mounted by means of the offset axle 43 and a coaxial spring 50 having one end anchored to the bearing 44 and the remaining end anchored to the periphery of the axle 43. Thus, as the wheel 42 pivots due to changes in ground contour, the spring 50 will be wound more or less tightly and will serve to counteract this movement and return the wheel 42 to its balanced normal position.

Figure 4:
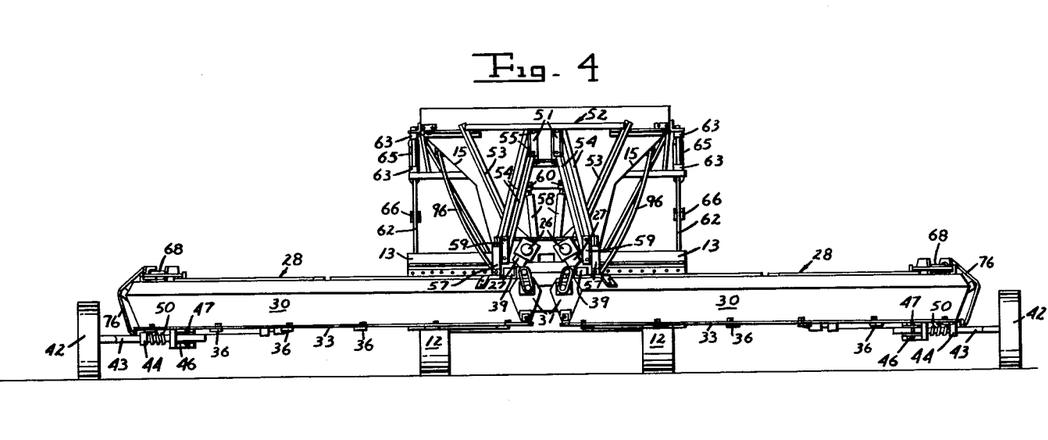
FIGURE 4 is a rear view of the assembly as seen in FIGURE 3.
Figure 5:
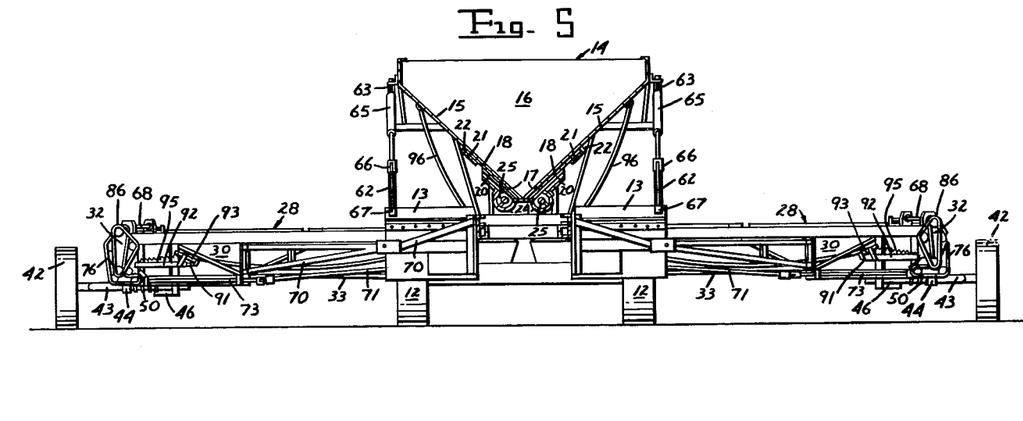
FIGURE 5 is a sectional view taken along line 5—5 in FIGURE 3.
Figure 6:
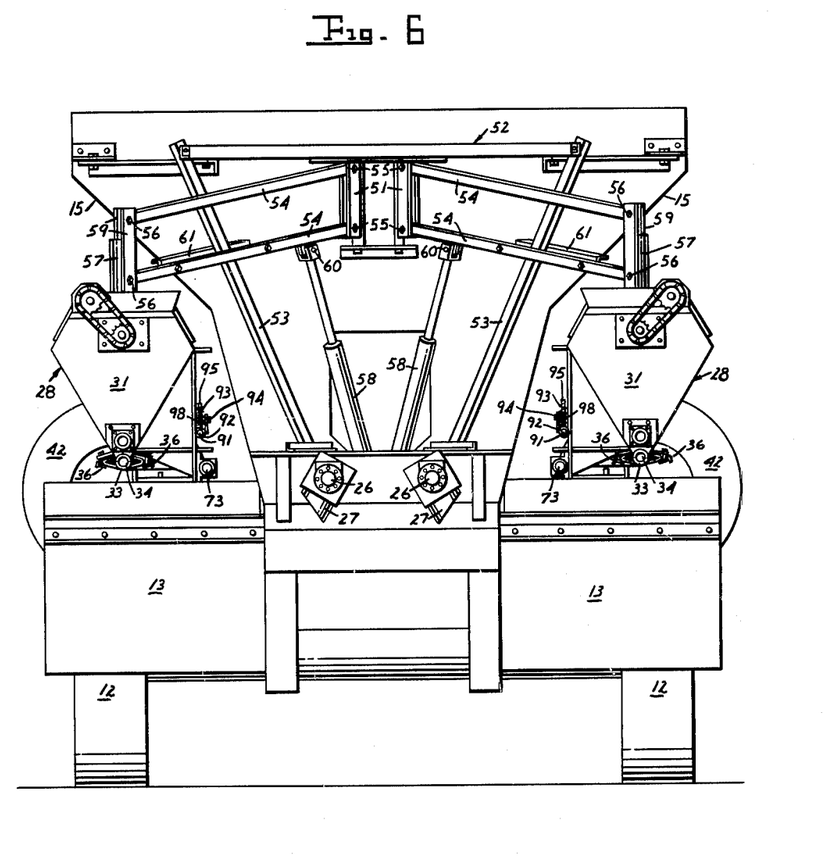
FIGURE 6 is an enlarged rear view of the apparatus with the distribution hoppers mounted for transport.
Figures 9, 10:
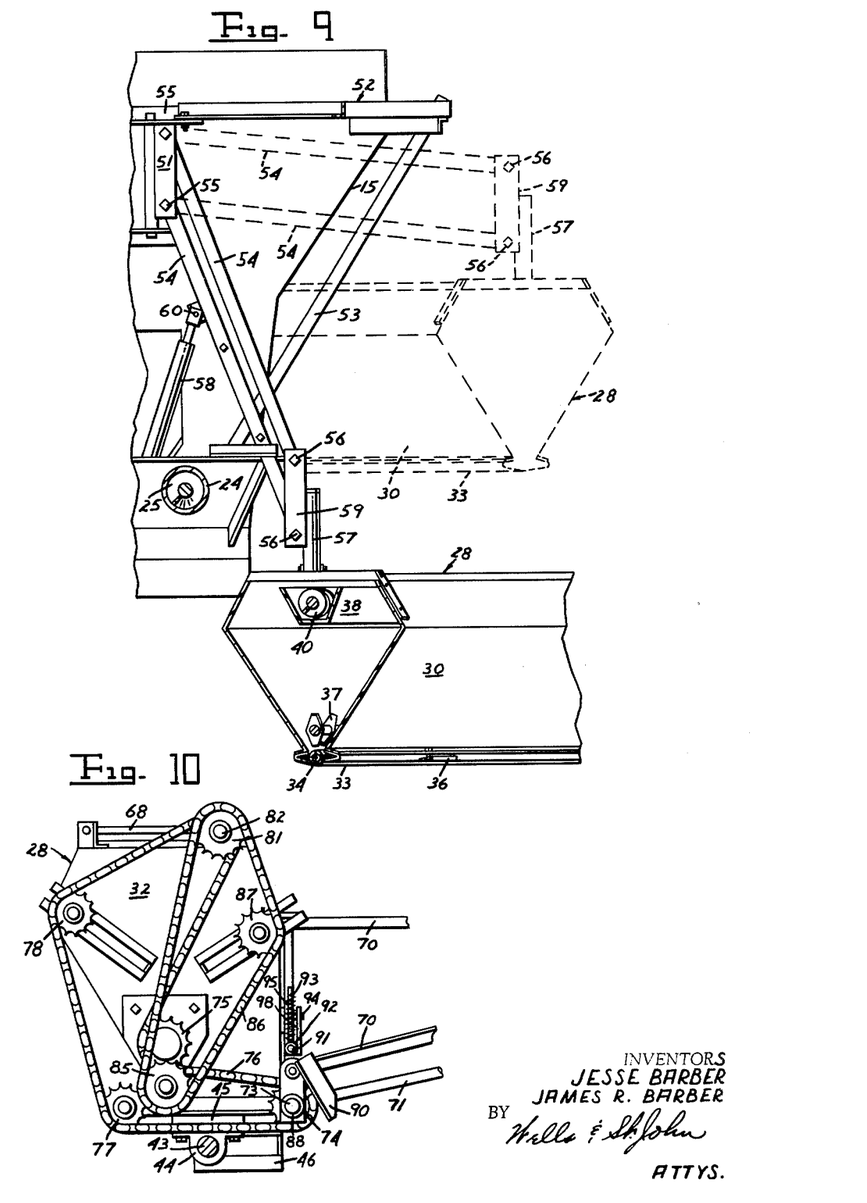
FIGURE 9 is an enlarged fragmentary rear view of one mounting arrangement for the rear end of a distribution hopper as seen along line 9—9 in FIGURE 3, the transport position of the hopper being shown in dashed lines.
FIGURE 10 is an enlarged end view of the driving arrangement at the outer end of a distribution hopper as seen along line 10—10 in FIGURE 3.

The rear end of the distribution hopper 28 is carried by an elevationally adjustable support best seen in FIGURES 4, 6, and 9. This comprises a rear bracket 51 fixed to the rear end of the hoppers 14 on truck 10. Also located at this portion of the truck is a rigid frame 52 including angularly located guides 53 that extend both upwardly and outwardly from the bottom section of the rear hopper 14. The guides 53 position parallel arms 54 that are pivoted at 55 to the rear bracket 51. The outer ends of the parallel arms 54 are pivoted at 56 to a bracket 59, which in turn is fixed to a post 57 pivotally mounted at the rear end of the hopper 28. The post 57 is mounted on the hopper 28 for pivotal movement relative to hopper 28 about a vertical axis. Thus, the arms 54 are mounted for elevational adjustment in a particular upright plane determined by the angular position of the guide 53 on which they ride due to straps 61 on the lower arm 54 that serve to straddle the guides 53. The hopper 28, however, is also free to pivot about the vertical axis of post 57 and also about the pivotal axis of post 57. The hopper 28 is therefore free to tilt and pivot relative to the bracket 59 and arms 54.

The elevation of each hopper 28 at its rear end is controlled by the arms 54, which are selectively movable by a hydraulic cylinder 58 pivoted at its lower end to the body of truck 10 and having a connection 60 to the intermediate portion of the lower parallel arm 54. The cylinder 58 is capable of moving the arms 54 from the position shown in full lines in FIGURE 9 to the elevated position shown in dashed lines. The elevated position is utilized for storage or transport purposes, while the lowered position is utilized to distribute fertilizer in the field.

The remainder of the hopper 28 is elevationally adjustable by means of a detachable side support 62 that is best seen in FIGURES 1 and 2. The support 62 is pivotally mounted about a pivot 64 on a bracket 63, which in turn is pivotally mounted on the side 15 of the truck 10. The support 62 is movable by means of a cylinder 65 having its upper end pivoted to the bracket 63 and its lower end connected at 66 to the intermediate portion of the side support 62. The outer end of the support 62 is provided with a releasable clevis, which is selectively clamped about a rod 68 fixed to the upper forward end of the hopper 28. The rod 68 has sufficient length to allow the free movement of clevis 67 when the connected hopper 28 is swung outwardly from the truck 10 by pivoting the bracket 63.

When the hopper 28 is in its field or operating position as seen in FIGURE 3, the support 62 is disconnected by release of the clevis 67 and hangs loosely from the side of the truck as shown in FIGURE 2. The forward end of the hopper 28 is then located relative to truck 10 by means of a rigid brace 70 pivotally mounted at the side of the hopper 28 and releasably fixed to the truck 10. In this manner, the location of the hopper 28 is maintained in a fixed position during operation.

The driving mechanism for the metered feed assembly is powered by means of a universal connection at each side of truck 10 shown as 71. The universal connection 71 is fixed to the driving hub 72 on the respective wheels 12 and powers a driving shaft 73 rotatably journalled on the respective hopper 28 and extending to the outer or forward ends thereof.

Figure 7:
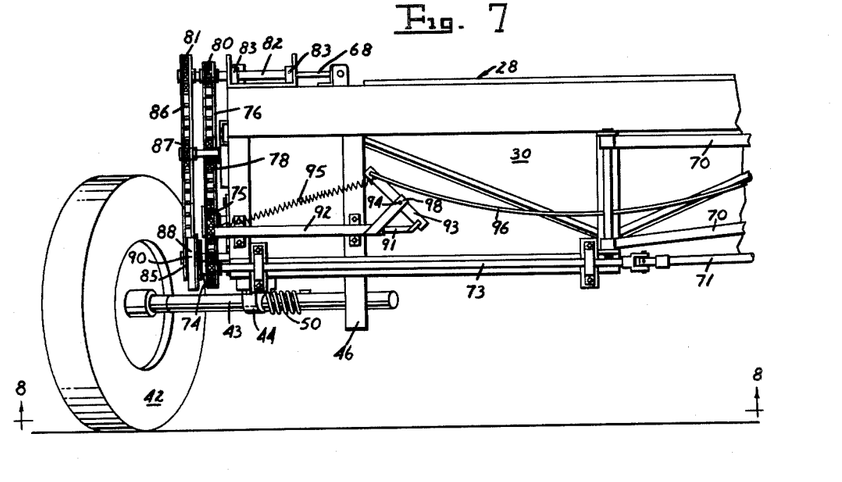
FIGURE 7 is an enlarged fragmentary elevation view of the outer end of one distribution hopper as seen along line 7—7 in FIGURE 3.
Figure 8:
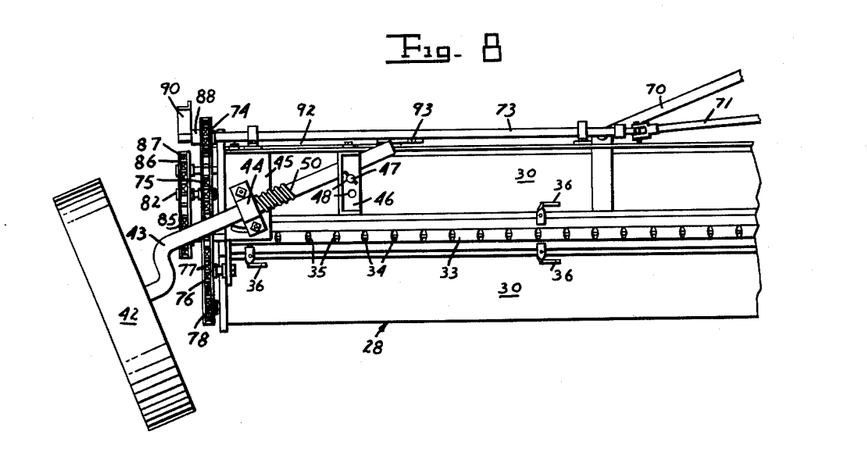
FIGURE 8 is a bottom view of the apparatus as seen along line 8—8 in FIGURE 7.

The driving mechanism for the metered feed assembly can best be understood from the showings of FIGURES 7 and 10. The shaft 73 turns a sprocket 74 by means of a releasable clutch 88 described below. Sprocket 74 in turn rotates a sprocket 75 at the forward end of the agitator 37 within hopper 28. Rotation of sprocket 75 is accomplished through a chain 76, which also is entrained about an idler sprocket 77 and an adjustably mounted idler sprocket 78, both rotatably mounted at the forward end plate 32 of the distribution hopper 28. Chain 76 also turns a driving sprocket 80, which is fixed to a shaft 82 rotatably mounted at the top portion of the distribution hopper 28 by means of bearings 83. Shaft 82 also has fixed thereon a second sprocket 81 that turns the metered feed screw 34 by means of a sprocket 85 fixed to its protruding end. Turning of the sprocket 85 is accomplished by means of a chain 86, which also is carried about an adjustably mounted idler sprocket 87 located on the end plate 31. The purpose of the adjustably mounted idler sprockets 78 and 87 is to accommodate various sizes of sprockets in the driving and driven positions in order to vary the relative speeds of the feed screw 34 and agitator 37, both relative to one another and also relative to the ground speed of the truck 10.

It is desirable to have controls available by which feeding of fertilizer by the screw 34 can be stopped when required, such as when turning corners, crossing areas not to be fertilized, etc. This is accomplished in the present case by use of a conventional releasable clutch 88 interposed on the driving shaft 73 between the shaft 73 and the first driven sprocket 74. The clutch 88 is not shown in detail in the drawings, but generally includes a bracket 90 that normally rotates with the driven sprocket 74. When an obstruction prevents rotation of the bracket 90, the clutch 88 releases, so that the sprocket 74 is then held in a stationary position.

In the present instance, as can best be seen in FIGURE 7, there is provided a slidable rod 91 received within a guiding collar 92 fixed to the side of the hopper 28. The rod 91 is pivotally connected at its outer end to an actuating arm 93, pivoted at 94 to an angular bracket 98 fixed to the collar 92. The arm 93 is biased to a retracted position within the collar 92 by means of a tension spring 95 connected between the outer end of arm 93 and the far end of collar 92. The rod 91 can be moved to the left as seen in FIGURE 7 by pulling a rope 96 which is guided along the length of the hopper 28 and along the sides 15 of the hoppers 14 to a location within the cab 11 of the truck 10. Thus, the operator of the apparatus can selectively prevent distribution of fertilizer to the ground below hopper 28 by pulling on the rope 96 at each side of the structure.

The hydraulic motors 26 that turn the feed augers 25 and the hydraulic motors 39 that turn the distribution augers 40 are preferably connected in series so that the augers 25 and 40 are operated together at all times. The controls for these motors are preferably mounted in the cab 11 so as to be under the convenient control of the driver of truck 10. The controls for the two cylinders 58 and 65 at each side of the truck 10 are preferably located near the front of the hoppers 14 at the respective sides so as to be accessible to the operator, who must manually swing the hopper 28 to its desired angular location relative to the truck 10. In the drawings, these controls for cylinders 58 and 65 are shown generally at 97, it being understood that similar controls would be located at the opposite side of the track.

In general, the operation of this structure is believed to be clear from the preceding description. The truck 10 serves as a bulk storage unit as well as a distribution unit for spreading fertilizer on a field. The hoppers 14 can carry a large supply of fertilizer, so that the operator of the truck 10 need not stop to refill his apparatus except at rather great intervals. For transport use, the distribution hoppers 28 are carried in the manner illustrated in FIGURES 1 and 6. In this manner, the cylinders 58 and 65 are utilized to hold the hoppers 28 in an elevated position along the sides 15 of hoppers 14 and directly above the protecting fenders 13.

When it is desired that the apparatus be assembled for field use, one man can readily reposition the hoppers 28. He first swings the front end of a hopper 28 outwardly about its rear pivot post 57, causing the side support 62 to pivot about its pivotal support 64 on bracket 63. After the fender 13 has been cleared by the hopper 28, the hopper 28 is lowered by expanding the cylinder 65 until the wheel 42 is in ground contact. The rear end of hopper 28 is then lowered by contracting the respective cylinder 58 until the hopper 28 is parallel to the supporting ground. The hopper 28 is then disconnected from the support 62 by release of the clevis 67 from rod 68. The brace 70 must then be swung inwardly from the hopper 28, at the same time pivoting the hopper 28 further outward about its pivotal post 57 at the rear end thereof. When the proper angular position has been obtained, the outer end of the brace 70 is fixed to the receiving bracket at the side of truck 10. At this time, the rear end of the trough 38 will lie beneath the discharge tube 27 at that side of the machine for reception of material from the auger tube 24 extending along the side of hoppers 14.

After the hopper 28 has been properly positioned relative to the truck 10, the outer wheel 42 must be angularly adjusted to bring it into a parallel relation relative to the rear wheels 12 with which it will then be transversely aligned. It is important that the wheels 42 and the wheel 12 on truck 10 be in transverse alignment, so that the truck 10 can turn about its usual radius without causing any of the wheels to slip. The wheels 42 are are completely idle, and are not utilized to drive any of the apparatus mounted on the hopper 28. Finally, the universal connection 70 must be made to the adjacent hub 72 on wheel 12 of truck 10, providing the driving connection for the metered feed arrangement.

The remaining side of the truck is positioned in precisely the same manner. The operator of the truck 10 can then drive the truck 10 and the hoppers 28 carried thereon through a field, controlling the rate of delivery of fertilizer by selective positioning of the doors 18 at the bottom of the hoppers 14 and by controlling the speed of hydraulic motors 26 and 39. Trough 38 will carry fertilizer from the inner end of the hopper 28 to its outer end, dropping the fertilizer along the way at any point wherein the fertilizer in the main body of hopper 28 does not reach the elevation of the bottom of the trough 38. In this manner, hopper 28 will be maintained completely full and level at all times, assuming that the proper balance of feed speed and quantity is attained for a particular material. The operator in cab 11 has control of the metered feed arrangement by means of the ropes 96 previously described, which can selectively release the clutches 88 when desired.

After field use of the apparatus is concluded, the hoppers 28 are repositioned along the sides of the hoppers 14 on truck 10 by a reversal of the procedures described. The wheels 42 are repositioned parallel to the outer end plate 32 on which they are supported. The connections 71 are released and folded back along the hoppers 28. The braces 70 are also released and folded back along the sides of hoppers 28. The hoppers 28 are then pivoted to a location wherein the rod 68 at the top outer end of each can be grasped by the respective clevis 67 on the side support 62 at that side of truck 10. The rear end of hopper 28 is then lifted by expanding the cylinder 58 to raise the arms 54. The front end of hopper 28 is then raised by contraction of the cylinder 65 to raise the side support 62, and the hopper 28 is then swung inwardly to the position shown in FIGURE 1 and also in FIGURE 6.

Various modifications might be made in the structure illustrated without deviating from the scope of the invention, which is concerned with the basic support assembly and feed assembly which allows the truck 10 to double as a storage and transport device as well as a field distribution apparatus for the spreading of fertilizer. For these reasons, only the following claims are intended to limit the scope of the invention.

Having thus described our invention, we claim:
1. A fertilizer distributing apparatus, comprising:
   a wheeled truck having a fertilizer storage hopper supported thereon, said storage hopper having downwardly converging inside walls having at least one outlet along the lower portions thereof;
   a fertilizer distributing hopper supported at the rear end of said truck and extending outwardly at one side thereof parallel to the ground surface;
   an auger feed conveyor in open communication with the outlet of said storage hopper, the exit end of said feed conveyor being in communication with the interior of the distributing hopper at the end thereof adjacent said truck;
   a support member pivotally connected between the storage hopper and the distributing hopper including a cylinder assembly to adjustably position said distributing hopper relative to said storage hopper;
   said distributing hopper being provided with a longitudinal trough extending along the interior thereof the full length of the hopper, said trough having open apertures at its lower surface located at spaced intervals along the length thereof;
   and a powered auger rotatably mounted in said distributing hopper directly above the trough, the outlet of said auger feed conveyor being directed to one end of said auger.

2. A fertilizer distributing apparatus, comprising:
   a wheeled truck having a fertilizer storage hopper supported thereon, having downwardly converging inside walls provided with at least two outlets located along opposite side of said hopper at the lower section thereof;
   a pair of fertilizer distributing hoppers individually supported at the rear end of said truck and extending outwardly at opposite sides thereof parallel to the ground surface;
   a pair of auger feed conveyors on said truck positioned at opposite sides of said storage hopper in communication with the outlets of said storage hopper at the respective sides thereof, the exit ends of said feed conveyors respectively being in communication with the interior of the distributing hopper extending from the adjacent side of said truck at locations adjacent to said truck;

a pair of support members positioned respectively at opposite sides of said storage hopper, each support member being pivotally connected between the storage hopper and the distributing hopper at the respective side of said truck and including a cylinder assembly to adjustably position the distributing hopper connected thereto relative to said storage hopper;

each distributing hopper being provided with a longitudinal trough extending along the interior thereof, said trough having open apertures at its lower surface located at spaced intervals along the length thereof;

and a powered auger rotatably mounted on each distributing auger directly above the trough, the respective outlets of said auger feed conveyors being directed to the inner ends of said augers relative to the truck.

3. An apparatus as defined in claim 2 wherein each distributing hopper is individually carried on the rear of the truck for elevational motion between an operating location adjacent the supporting ground surface and an elevated storage location adjacent to one side of the truck;

said support members being connected between the storage and the respective distributing hoppers to permit the distributing hoppers to be moved between a storage position longitudinally adjacent to said storage hopper and an operating position extending outwardly therefrom.

References Cited by the Examiner
UNITED STATES PATENTS

| | | |
|---|---|---|
| 2,473,587 | 6/1949 | Huston. |
| 2,583,608 | 1/1952 | Smith. |
| 2,797,028 | 6/1957 | Stoltzfus. |
| 2,813,704 | 11/1957 | MacKissic _______ 222—176 X |

EVON C. BLUNK, *Primary Examiner.*

CHARLES R. CARTER, *Examiner.*